United States Patent
Knoppert et al.

(10) Patent No.: US 11,422,639 B2
(45) Date of Patent: Aug. 23, 2022

(54) ONE-FINGER MOUSE

(71) Applicant: Dell Products, L.P., Round Rock, TX (US)

(72) Inventors: Michiel Sebastiaan Emanuel Petrus Knoppert, Amsterdam (NL); Kyu Sang Park, Austin, TX (US); Frank Franciscus Maria Bertrand van Valkenhoef, 's-Hertogenbosch (NL)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/844,465

(22) Filed: Apr. 9, 2020

(65) Prior Publication Data

US 2021/0318763 A1 Oct. 14, 2021

(51) Int. Cl.
*G06F 3/0354* (2013.01)
*G06F 3/0484* (2022.01)

(52) U.S. Cl.
CPC ...... *G06F 3/03541* (2013.01); *G06F 3/03547* (2013.01); *G06F 3/0484* (2013.01)

(58) Field of Classification Search
CPC . G06F 3/03541; G06F 3/0484; G06F 3/03547
See application file for complete search history.

(56) References Cited

U.S. PATENT DOCUMENTS

| | | | | |
|---|---|---|---|---|
| 2004/0263477 | A1* | 12/2004 | Davenport | G06F 3/0383 345/163 |
| 2006/0139327 | A1* | 6/2006 | Dawson | G06F 3/0325 345/158 |
| 2010/0117962 | A1* | 5/2010 | Westerman | G06F 3/04883 345/163 |
| 2012/0105329 | A1* | 5/2012 | Chang | G06F 3/03543 345/163 |
| 2015/0041302 | A1* | 2/2015 | Okumura | G06F 3/0443 200/600 |
| 2016/0098100 | A1* | 4/2016 | Chang | G06F 3/0317 345/166 |
| 2017/0132828 | A1* | 5/2017 | Zelenin | A63F 13/45 |
| 2018/0143728 | A1* | 5/2018 | Withers | G06F 3/0412 |
| 2019/0332392 | A1* | 10/2019 | Pant | H04L 9/3213 |

* cited by examiner

*Primary Examiner* — Mark W Regn
(74) *Attorney, Agent, or Firm* — Fogarty LLP

(57) ABSTRACT

A mouse usable as a wheel input device is described. In an embodiment, a mouse may include: a top surface; a touch sensor coupled to the top surface; a controller coupled to the touch sensor; and a memory coupled to the controller, the memory having instructions stored thereon that, upon execution by the controller, cause the mouse to: in response to detection, by the touch sensor, of a force against the top surface: (a) identify a primary click if the force is equal to or greater than a first threshold and smaller than a second threshold, or (b) identify a secondary click if the force is equal to or greater than the second threshold.

20 Claims, 8 Drawing Sheets

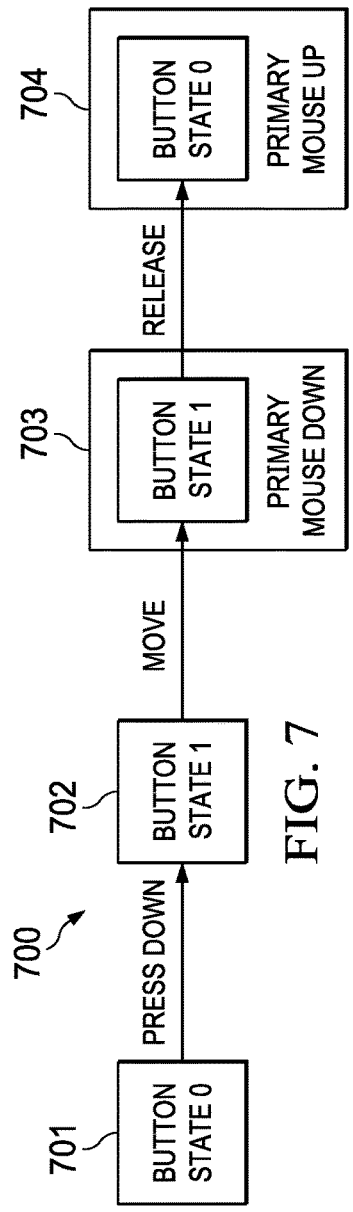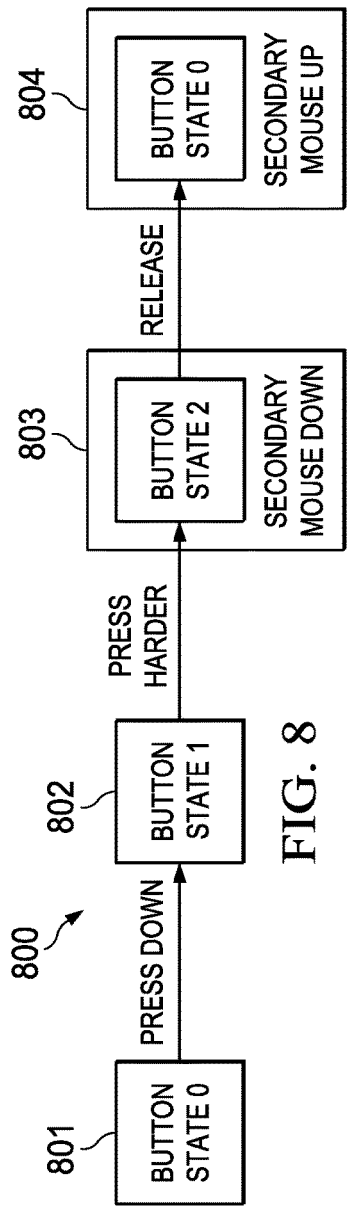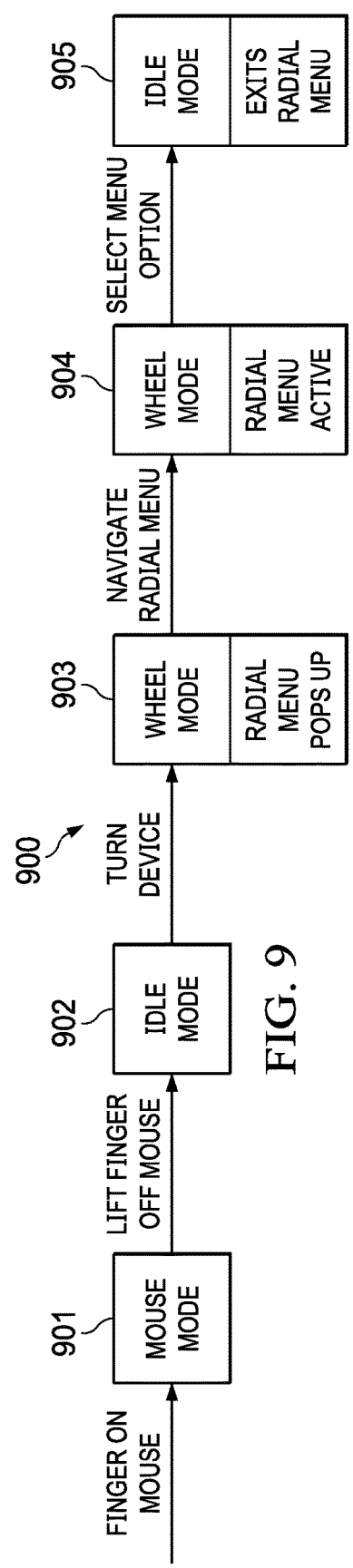

ONE-FINGER MOUSE

FIELD

This disclosure relates generally to Information Handling Systems (IHSs), and more specifically, to a one-finger mouse.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A conventional mouse is a hand-held peripheral device that detects two-dimensional motion relative to a surface (e.g., a table or desk). This motion is typically translated into the action of a pointer or cursor on an IHS's display, which allows a smooth control of the IHS's graphical user interface (GUI). The original mouse design used a ball rolling on a surface to detect motion, but modern designs use optical sensors and do not require moving parts. In addition to manipulating a cursor on a display, a conventional mouse also has buttons that enable specific operations (e.g., as selection of a menu item).

As the inventors hereof have recognized, however, conventional mice are made to be large because they are intended to fit a user's entire hand, which reduces portability. The placement of multiple buttons, scrolling wheels, etc. on the top surface of a mouse further require that a mouse have a large size. To address these, and other problems, systems and methods described herein provide a one-finger mouse.

SUMMARY

Embodiments of a one-finger mouse are described. In an illustrative, non-limiting embodiment, a mouse may include: a top surface; a touch sensor coupled to the top surface; a controller coupled to the touch sensor; and a memory coupled to the controller, the memory having instructions stored thereon that, upon execution by the controller, cause the mouse to: in response to detection, by the touch sensor, of a force against the top surface: (a) identify a primary click if the force is equal to or greater than a first threshold and smaller than a second threshold, or (b) identify a secondary click if the force is equal to or greater than the second threshold.

The top surface may include a touch-sensitive, round dish configured to accommodate a single human finger. The touch sensor may include a capacitive sensor. Additionally, or alternatively, the touch sensor may include a piezoelectric sensor.

The instructions, upon execution by the controller, may cause the mouse to identify the primary click if the force is equal to or greater than the first threshold at a first instant and smaller than the first threshold at a second instant, without reaching the second threshold between the first and second instants. Additionally, or alternatively, the instructions, upon execution by the controller, may cause the mouse to identify the primary click as a click-and-drag command if a movement sensor coupled to the controller detects, between the first and second instants, movement equal to or greater than a threshold.

The mouse may be coupled to an Information Handling System (IHS), the IHS may be coupled to a display, and the primary click may convey a selection of a graphical user interface (GUI) item rendered by the IHS via the display. Additionally, or alternatively, the secondary click may invoke a menu associated with a GUI item rendered by the IHS via the display.

In another illustrative, non-limiting embodiment, a memory device may have instructions stored thereon that, upon execution by a controller of a mouse, cause the mouse to: detect a force against a top surface of the mouse; and at least one of: (a) identify a primary click if the force is equal to or greater than a first threshold and smaller than a second threshold; or (b) identify a secondary click if the force is equal to or greater than the second threshold.

The top surface may include a touch-sensitive dish configured to accommodate a single human finger. The instructions, upon execution by the controller, may cause the mouse to identify the primary click if the force is equal to or greater than the first threshold at a first instant and smaller than the first threshold at a second instant, without reaching the second threshold between the first and second instants. The instructions, upon execution by the controller, may further cause the mouse to identify the primary click as a click-and-drag command if a movement sensor coupled to the controller detects, between the first and second instants, movement equal to or greater than a threshold.

The mouse may be coupled to an IHS, the IHS may be coupled to a display, and the primary click may convey a selection of a GUI item rendered by the IHS via the display. Additionally, or alternatively, the mouse may be coupled to an IHS, the IHS may be coupled to a display, and the secondary click may invokes a menu associated with a GUI item rendered by the IHS via the display.

In yet another illustrative, non-limiting embodiment, a method may include: detecting a force against a top surface of a cylindrical mouse; and at least one of: (a) identifying a primary click if the force is equal to or greater than a first threshold and smaller than a second threshold; or (b) identifying a secondary click if the force is equal to or greater than the second threshold.

The top surface may include a touch-sensitive dish configured to accommodate a single human finger. In some cases, identifying the primary click may include determining that the force is equal to or greater than the first threshold at a first instant and smaller than the first threshold at a second instant, without reaching the second threshold between the first and second instants. Additionally, or alternatively, the method may include identifying the primary click as a click-and-drag command if a movement sensor coupled to the controller detects, between the first and second instants, movement equal to or greater than a threshold a threshold.

The mouse may be coupled to an IHS, the IHS may be coupled to a display, and the primary click may convey a selection of a GUI item rendered by the IHS via the display. The secondary click may invoke a menu associated with a GUI item rendered by the IHS via the display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 7 is a flowchart of an example of a method for identifying a primary click-and-drag operation of a one-finger mouse, according to some embodiments.

FIG. 8 is a flowchart of an example of a method for identifying a secondary click-and-drag operation of a one-finger mouse, according to some embodiments.

FIG. 9 is a flowchart of an example of a method for switching between a mouse mode of operation and a wheel mode of operation, according to some embodiments.

DETAILED DESCRIPTION

Systems and methods described herein provide a one-finger mouse suitable for use as a peripheral device of an Information Handling System (IHS). In various embodiments, the one-finger mouse may be designed to be operated under a single user's finger (as opposed to the user's entire hand). Interactions may be redefined, for example, by implementing a two-stage (or multiple-stage) button or top surface, as well as movement threshold(s), to capture a user's clicking intent as primary clicks, secondary clicks, click-and-drag operations, etc.

In some cases, in addition to being used a pointing device, a one-finger mouse as described herein may have a cylindrical shape and may be further usable as a wheel input device, for example, to turn a virtual knob or dial in an IHS's graphical user interface (GUI), to select an item from a circular menu, etc.). For instance, the one-finger mouse may include a rotation sensor configure to determine whether the device is being used in mouse mode or in dial mode. Moreover, techniques for determining the mouse's current north-south orientation are provided.

Figure 1:
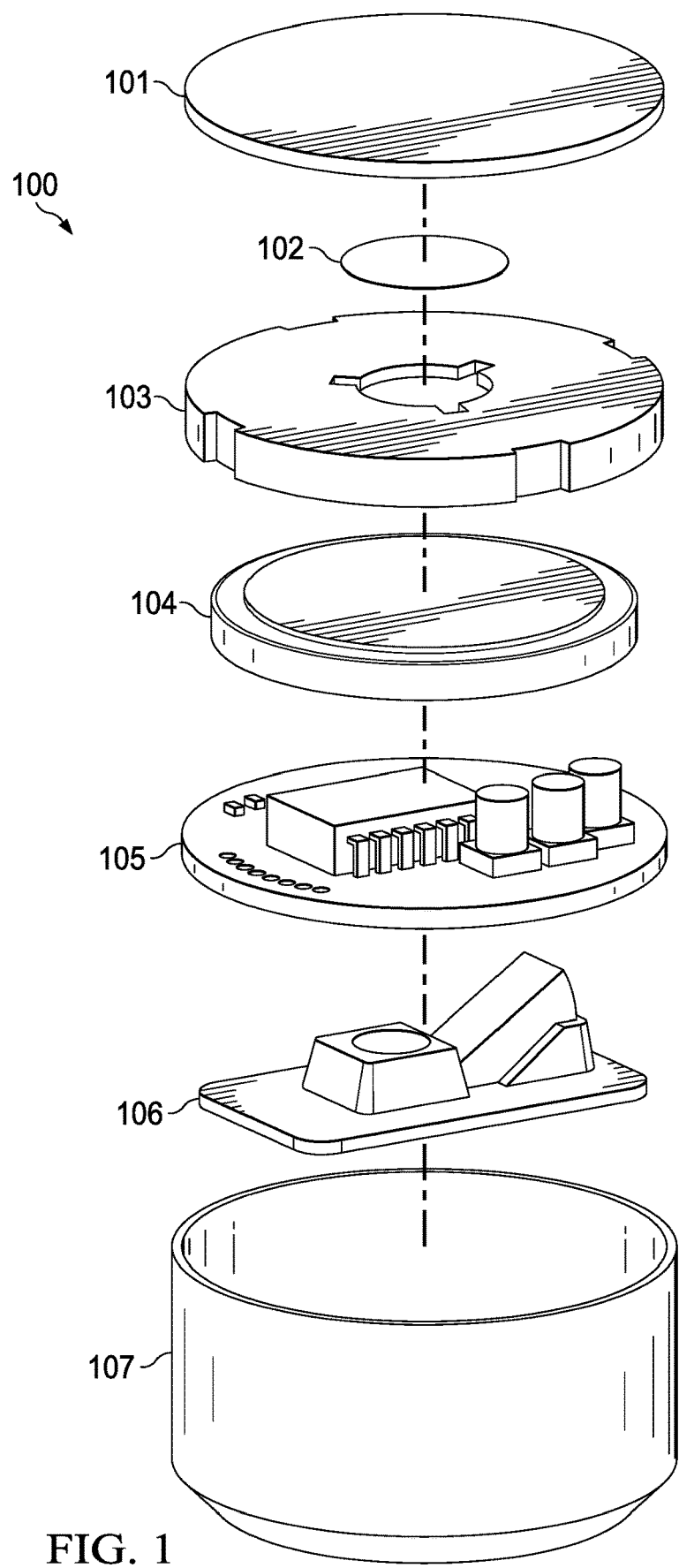
FIG. 1 is an exploded view of an example of a one-finger mouse, according to some embodiments.

To illustrate the foregoing, FIG. 1 is an exploded view of an example of a one-finger mouse, according to some embodiments. As shown, touch sensitive dish 101 sits atop haptic element(s) and/or sensor(s) 102. For example, dish 101 may include a trackpad or touchscreen. Haptic element(s) 102 may include, for example, piezoelectric or ultrasonic elements. Meanwhile, sensor(s) 102 may include, but are not limited to: electric, magnetic, hall effect, radio, optical, infrared, thermal, force, pressure, touch, capacitive, acoustic, ultrasonic, proximity, position, angle, turning, direction, movement, velocity, rotation, acceleration, gyroscopic sensors, etc.

Battery 104 sits between cover 103 and printed circuit board (PBC) 105. PCB 105 may host a number of components mounted thereon (e.g., a microprocessor, a memory, etc.). For example, battery 104 may be a rechargeable battery coupled to a power bus that enables the operation of other components. Fixed base 106 sits under PCB 105 and houses a number of other sensors (e.g., a mouse sensor, a movement sensor, etc.).

Casing 107 houses components 101-106. Casing 107 may be cylindrical in shape, such that dish 101 may be round. Moreover, the size of mouse 100 may be selected such that dish 101 is configured to accommodate a single human finger (e.g., a height of 27 mm for casing 105 and a diameter of 35 mm for dish 101). Although several of the aforementioned elements are shown having generally cylindrical or circular shapes, it should be noted that other shapes may be used in different mouse implementations (e.g., oval, square, etc.).

Figure 2A:
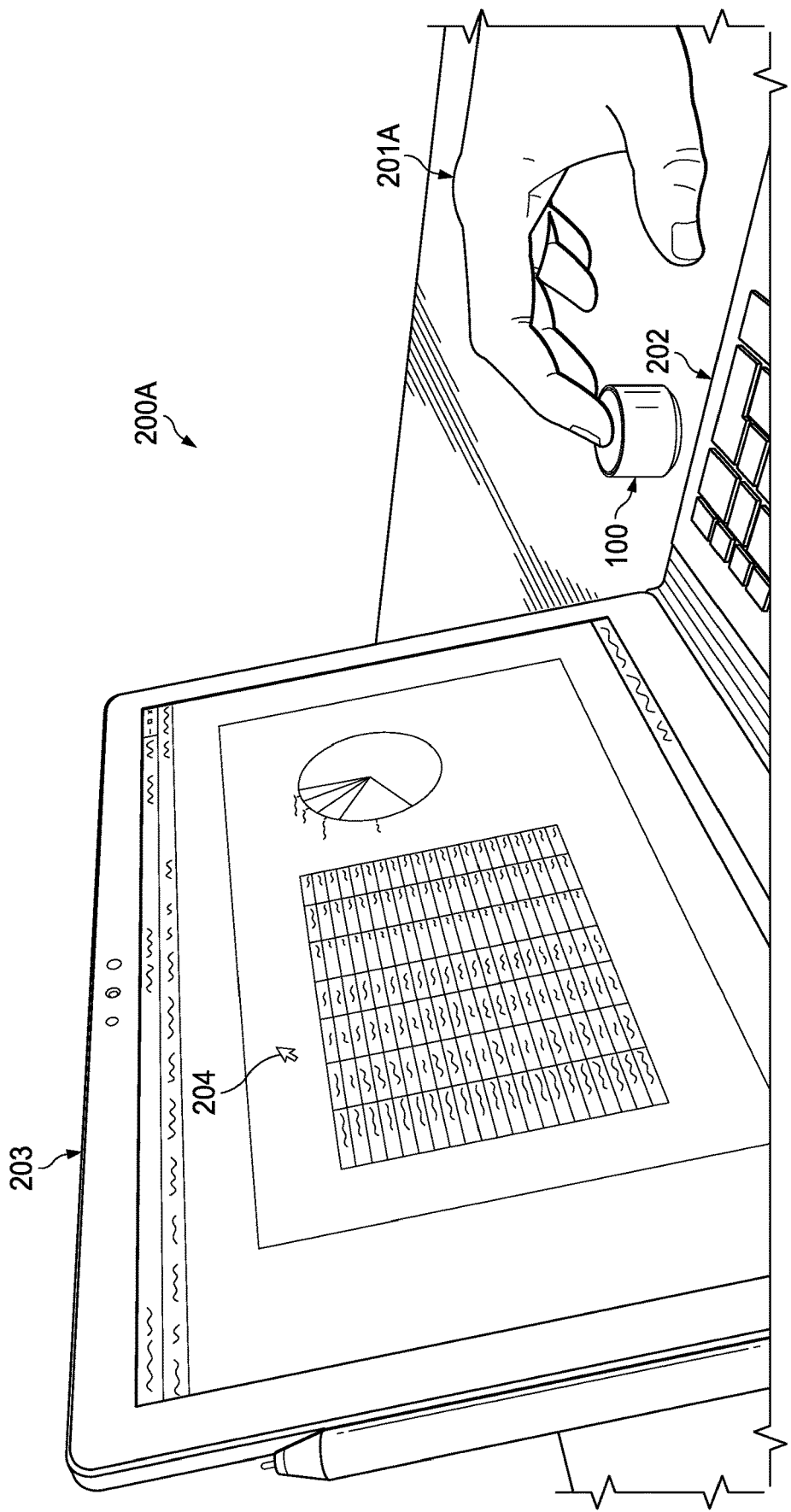
FIGS. 2A and 2B are perspective views of an example of a one-finger mouse being used with an Information Handling System (IHS) as a pointing device and as a wheel device, respectively, according to some embodiments.
Figure 2B:
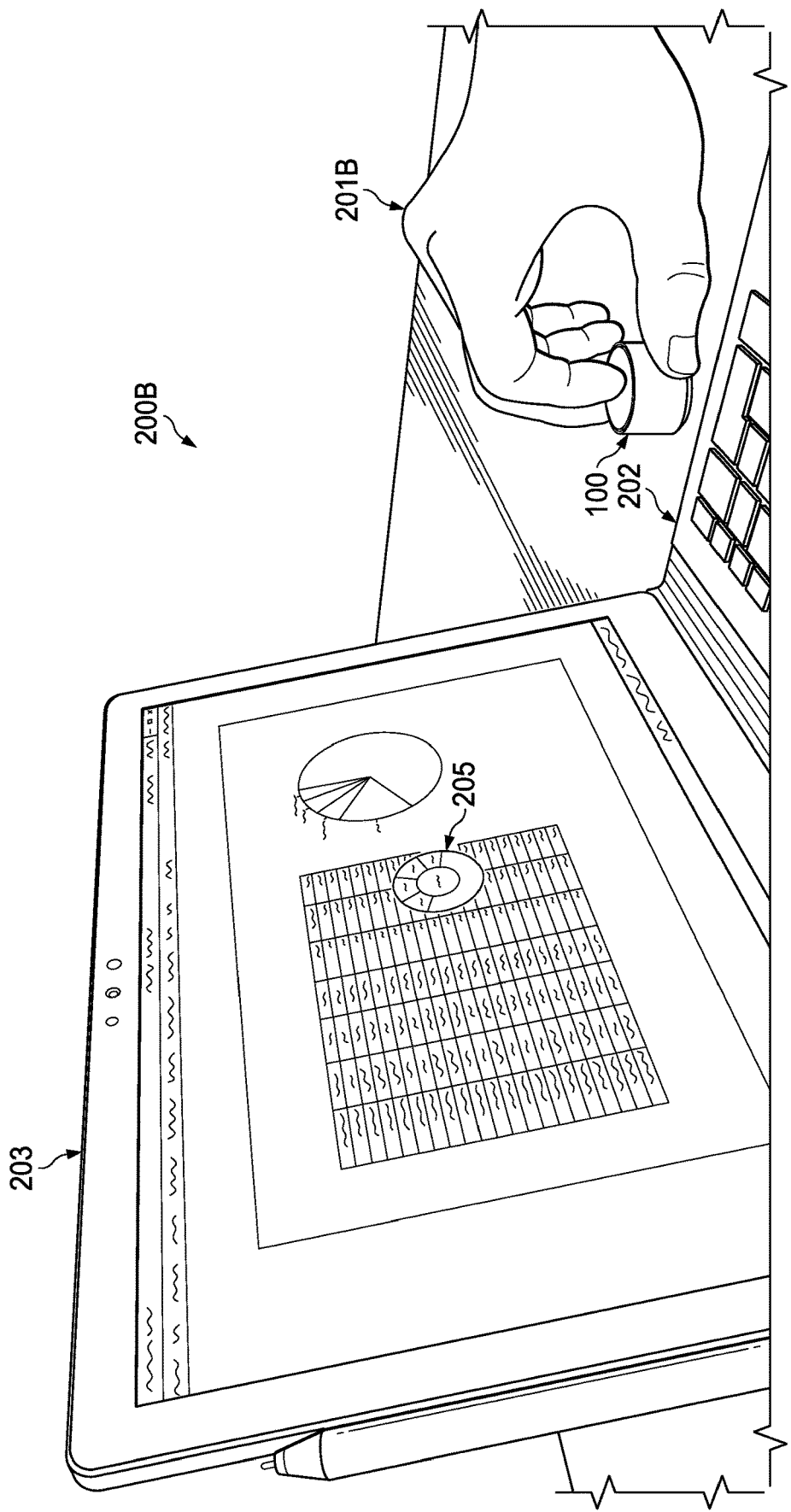

FIGS. 2A and 2B are perspective views of an example of mouse 100 usable with IHS 202 as pointing device 200A and as wheel device 200B, respectively. In FIG. 2A, mouse 100 is manipulated by user 201A while in "mouse mode," using a single finger, such that translational movements of mouse 100 are translated into movements of cursor 204 on display 203. In FIG. 2B, mouse 100 is manipulated by user 201B using two or more fingers while in "wheel mode," such that rotational movements of mouse 100 are translated into a rotation and/or selection of items displayed in radial menu 205.

In various implementations, to operate under only one finger, certain interactions may be redefined. Moreover, by adding two stages to the mouse button on dish 101 to receive a primary or "left-click" and a secondary or "right-click" mouse command, and/or by setting a movement threshold value (in order to switch between mode and/or to detect click-and-drag operations), a user's intent may be captured without loss of functionality.

It should be noted that a conventional mouse is designed to be held with the entire hand. In contrast, mouse 100 is designed to be operated under only one finger. Because the top surface 101 of mouse 100 is dished, it provides enough grip for the finger to easily move mouse 101 without requiring too much force. Also, in mouse 100 there is not enough room for a scroll wheel, so scrolling may be achieved with a touch sensitive top surface 101.

To fit a one-finger device, a conventional mouse's left and right click buttons may be replaced in mouse 100 with a setup that allows for a two-stage button, as shown in Table I below:

TABLE I

|  | Stage 1 | Stage 2 |
|---|---|---|
| Touchpad + dome button | tap | click |
| Two stage button | click | Second stage click |
| Piezo as sensor & actuator | click | Deep click |

TABLE I-continued

| | Stage 1 | Stage 2 |
|---|---|---|
| Piezo as actuator + force sensor | click | Deep click |

In various implementations, a user may switch to wheel input device mode, for example, to operate as a knob configured to that change the volume of the IHS's audio output, select an option from a radial menu in the IHS's graphical user interface (GUI) (e.g., a menu command, a color from a color pallet, etc.), or the like. Then, the user may switch back to mouse mode to resume using mouse 100 as a pointing device. These features enable a user to seamlessly go from one type of interaction into the other without requiring multiple, distinct devices.

In order to use device 100 as a mouse, a mouse/movement sensor may be deployed on fixed base 106. However, conventional mice lack radial sensing. To detect its own rotation, a conventional wheel input device may: (a) be used over a touch screen (of display 203 coupled to IHS 202), which limits it to on-screen use, or (b) include a top part that can rotate freely on a high-friction base, which prohibits the use of the device as a mouse because it restricts the device's translation.

In contrast, various embodiments described herein may use a gyrometer as one of sensor(s) 102 for radial sensing. To prevent drift, the gyrometer may be disabled when mouse 100 is operating in mouse mode.

In addition, to allow mouse 101 to act as a wheel input device, mouse 100 may be round, which may require a mechanism for user to identify the north and/or south (head and/or tail) of mouse 100, especially as mouse 100 switches between pointer and wheel modes of operation. Absent such a mechanism, when the user puts a finger on device 100 to start using it, the mouse can be in any position, and the pointer or cursor displayed on the screen can move in any direction.

To solve this, and other problems, mouse 100 may be calibrated every time the user puts a finger on dish 101. The user's north or up may be determined by sensing at the direction of the finger resting on the top surface 101 of mouse 100.

Figure 3B:
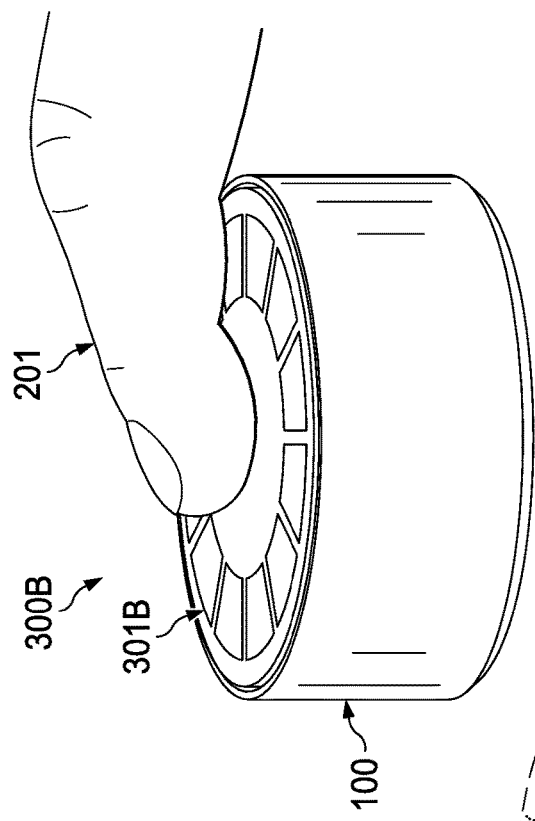
FIGS. 3A-D are perspective views of examples of orientation sensors for a one-finger mouse, according to some embodiments.
Figure 3A:
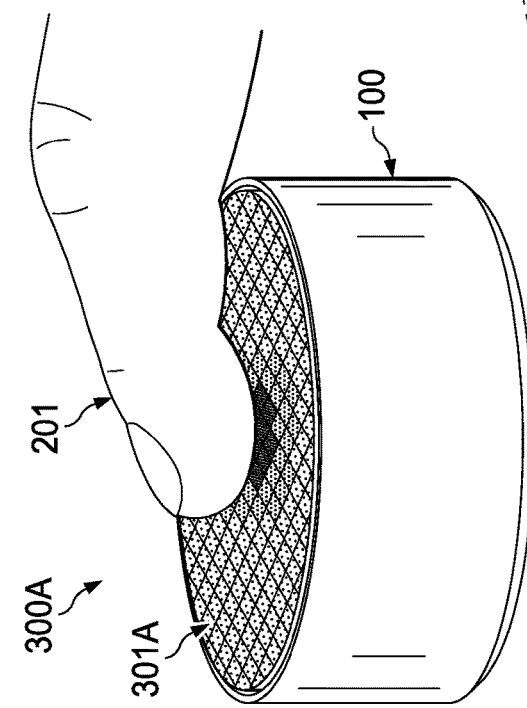
Figure 3C:
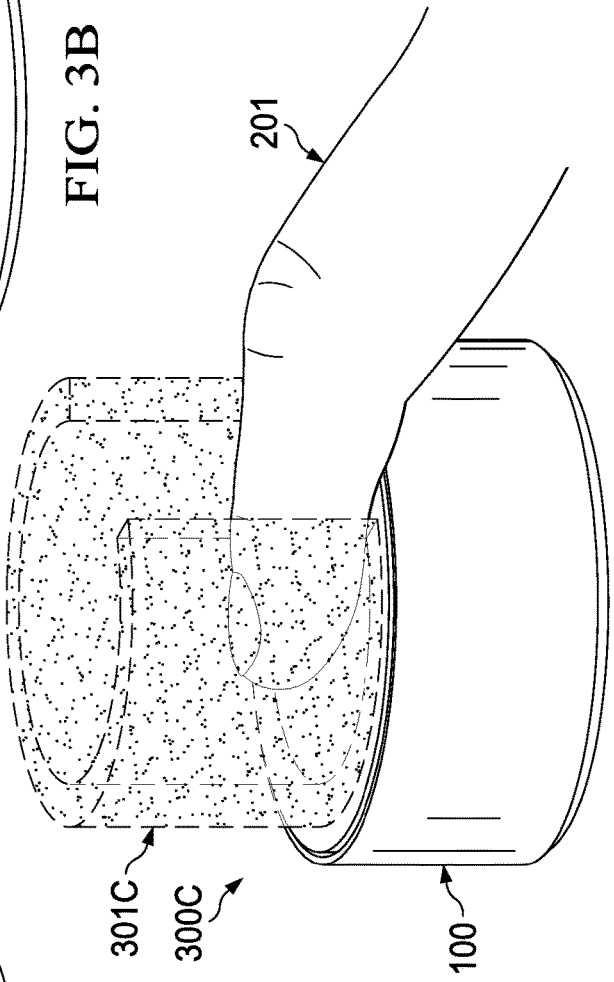
Figure 3D:
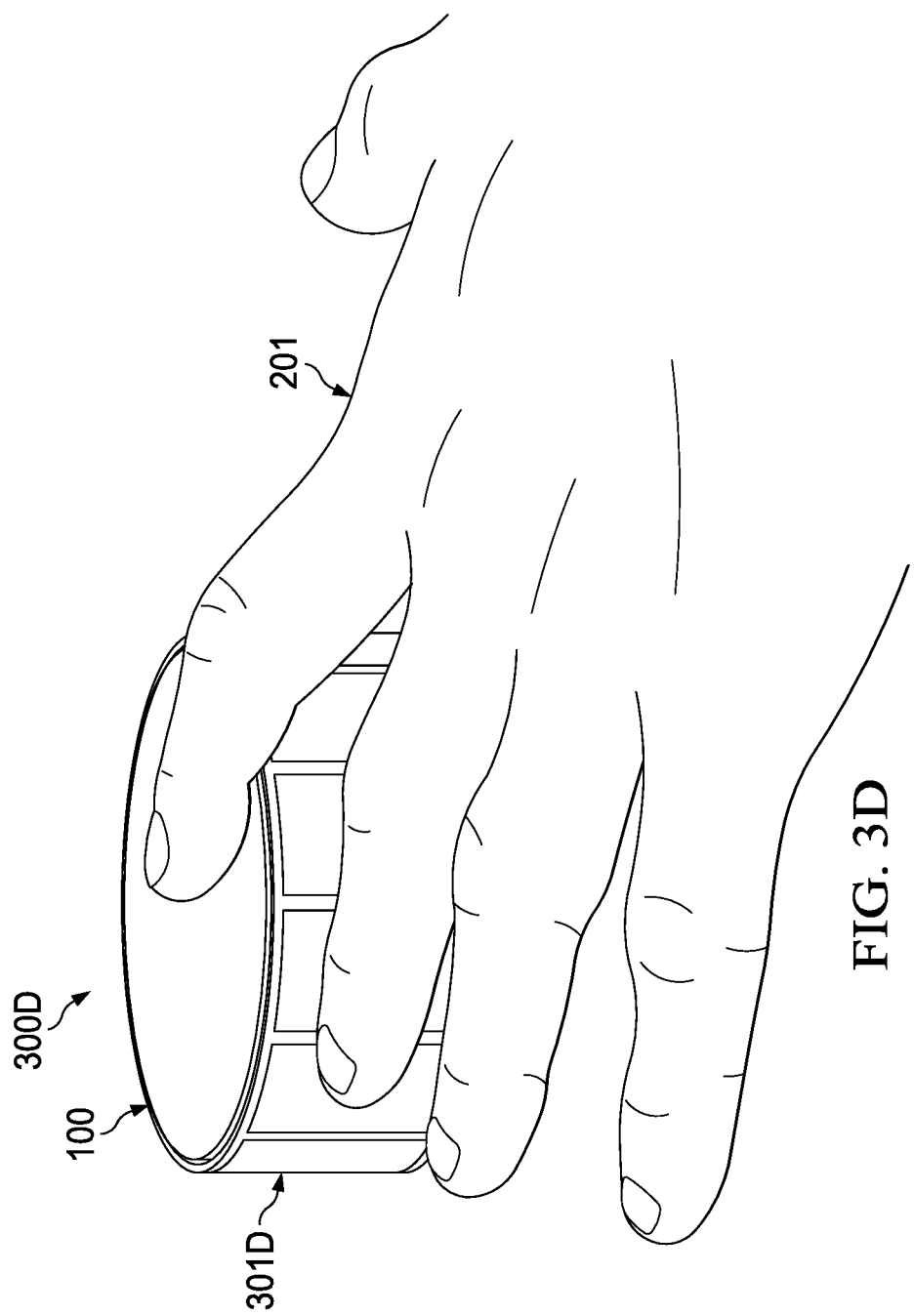

For example, FIGS. 3A-D are perspective views of examples of orientation sensors for a one-finger mouse, according to some embodiments. Particularly, FIG. 3A shows a touchpad heatmap 301A configured to sense the direction and/or position of finger 201 in implementation 300A. FIG. 3B shows a capacitive proximity grid top 301B configured to sense the direction and/or position of finger 201 in implementation 300B. FIG. 3C shows IR light grid top 301C configured to sense the direction and/or position of finger 201 in implementation 300C. And FIG. 3D shows lateral sensor 301D configured to sense the direction and/or position of resting fingers next to mouse 100 (the user may set mouse 100 for left-handed or right-handed use).

Figure 4:
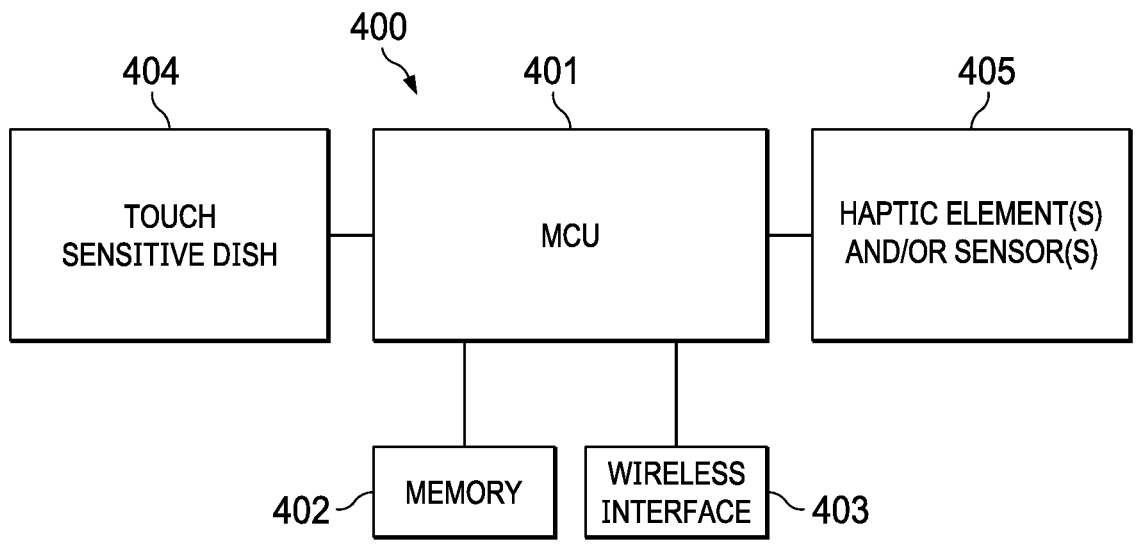
FIG. 4 is a block diagram of examples of internal components of a one-finger mouse, according to some embodiments.

FIG. 4 is a block diagram of examples of internal components 400 of mouse 100 usable as a one-finger mouse. In various embodiments, one or more of components 400 may be housed within casing 107. As depicted, components 400 include processor or microcontroller unit (MCU) 401. MCU 401 is coupled to memory 402 having program instructions stored thereon that, upon execution by MCU 401, cause mouse 100 to perform one or more of operations described in FIGS. 6-9.

MCU 401 is coupled to wireless interface 403 (e.g., RF circuitry and antenna) configured to implement BLUETOOTH, WiFi direct, or other suitable wireless communication protocol. MCU 401 is also coupled to touch sensitive dish circuitry 404 and haptic element(s) and/or sensor(s) circuitry 405. In various implementations, elements or modules 401-405 may be coupled to MCU 401 using any suitable bus, interface, or the like.

In various embodiments, a user's intent may be determined in order to enable mouse 100 to perform a number of operations, including, but not limited to, a primary (or "left") click, a secondary (or "right") click, a primary click-and-drag, and/or a secondary click-and-drag. In the examples that follow, "button state 0" is the state of mouse 100 when dish 101 is not pressed, "button state 1" is the state of mouse 100 when dish 101 receives a force equal to or greater than a first force threshold, and "button state 2" is the state of mouse 100 when dish 101 receives a force equal to or greater than a second force threshold, where the second threshold is greater than the first threshold and may be configurable by the user.

Figure 5:
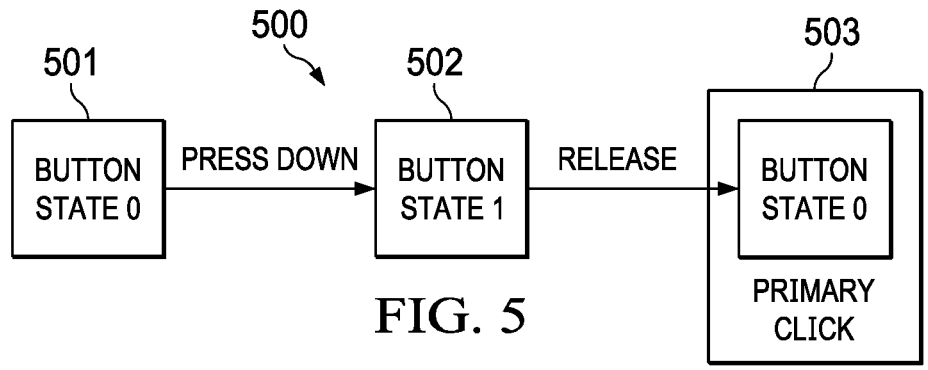
FIG. 5 is a flowchart of an example of a method for identifying a primary click of a one-finger mouse, according to some embodiments.

FIG. 5 is a flowchart of an example of method 500 for identifying a primary click of one-finger mouse 100. In some embodiments, method 500 may be performed in response to MCU 401's execution of program instructions stored in memory 402. Particularly, at block 501, mouse 100 is in button state 0. At block 502, when the user presses down on dish 101 with a force greater than the first force threshold, mouse 100 enters button state 1. Because (as described below) the secondary click is "hidden under" the second force threshold, the primary click is not activated on button press, but rather it is activated upon button release. Accordingly, upon release, mouse 100 returns to button state 0 at block 503, and MCU 401 interprets sequence of events 501-503 as a primary or left click.

Figure 6:
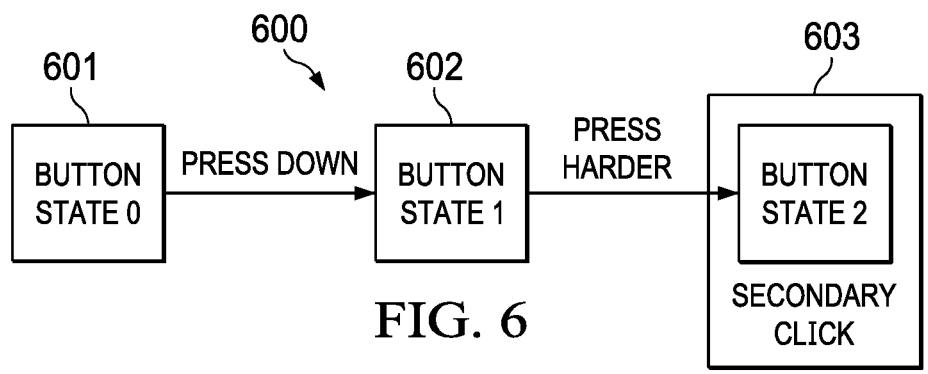
FIG. 6 is a flowchart of an example of a method for identifying a secondary click of a one-finger mouse, according to some embodiments.

FIG. 6 is a flowchart of an example of method 600 for identifying a secondary click of one-finger mouse 100. In some embodiments, method 600 may be performed in response to MCU 401's execution of program instructions stored in memory 402. Particularly, at block 601, mouse 100 is in button state 0. At block 602, when the user presses down on dish 101 with a force greater than the first force threshold, mouse 100 enters button state 1. Then, at block 603, when the user presses down on dish 101 with a force greater than the second force threshold, mouse 100 enters button state 2, and MCU 401 interprets sequence of events 601-603 as a secondary or right click.

FIG. 7 is a flowchart of an example of method 700 for identifying a primary click-and-drag operation of one-finger mouse 100. In some embodiments, method 700 may be performed in response to MCU 401's execution of program instructions stored in memory 402. Referring back to method 500, because both click and release are performed on button release, it would not be possible for a user to click-and-drag based upon the clicking action alone. To address this, method 700 adds detection of a movement threshold. By moving the mouse more than a set threshold, the user can show its intent to perform a click-and-drag operation.

Particularly, at block 701, mouse 100 is in button state 0. At block 702, the user presses down on dish 101 with a force greater than the first force threshold, and mouse 100 enters button state 1. If the mouse moves—that is, if the user translates mouse 100 by a distance (or with a speed) greater than a minimum threshold value prior to releasing the button, at block 703 MCU 401 interprets sequence of events 701-703 as initiating a primary or left click-and-drag command, and IHS 202 performs a corresponding operation on display 203. At block 704, upon release of the button (that is, once the force detected on dish 101 is smaller than the first threshold), mouse 100 returns to button state 0, and MCU 401 interprets event 704 as ending the primary or left click-and-drag command.

FIG. 8 is a flowchart of an example of method 800 for identifying a secondary click-and-drag operation of one-finger mouse 100. In some embodiments, method 1000 may be performed in response to MCU 401's execution of program instructions stored in memory 402. Particularly, at block 801, mouse 100 is in button state 0. At block 802, the user presses down on dish 101 with a force greater than the first force threshold, and mouse 100 enters button state 1.

Then, at block 803, the user presses down on dish 101 with a force greater than the second force threshold, and mouse 100 enters button state 2. MCU 401 interprets sequence of events 801-803 as initiating a secondary or right click-and-drag command, and IHS 202 performs a corresponding operation on display 203. At block 804, upon release of the button (that is, once the force detected on dish 101 is smaller than the second threshold), mouse 100 returns to button state 0, and MCU 401 interprets event 804 as ending the secondary or right click-and-drag command.

FIG. 9 is a flowchart of an example of method 900 for switching between a mouse mode of operation and a wheel mode of operation. In some embodiments, method 900 may be performed in response to MCU 401's execution of program instructions stored in memory 402. Particularly, at block 901, mouse 100 may detect a finger placed on dish 101. At block 902, when the finger is lifted from dish 101, mouse 100 enters an idle mode of operation (e.g., an energy saving mode, etc.). Then, at block 903, mouse 100 detects its own rotation (above a configurable rotation threshold value) and enters a wheel, dial, or knob mode of operation. Still at block 903, in response to mouse 100 entering wheel mode, IHS 202 may cause radial menu 205 to appear on display 203. In some cases, radial menu 205 may be contextual and it may comprise items or options depending upon the current state of IHS 202 (e.g., which applications are running or in the foreground, etc.).

At block 904, while radial menu 205 is active on display 203, the user rotates mouse 100 clockwise or counterclockwise to navigate radial menu 205, for example, by highlighting different items of menu 205 corresponding to the angle of rotation of mouse 100). At block 905, the user may use a primary click to select the highlighted item, and mouse 100 may return to the idle mode of operation. In response, IHS 202 may remove radial menu 205 from display 203. Moreover, mouse 100 may re-enter the mouse mode of operation upon a subsequent detection of a single finger 201 on dish 101.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 10:
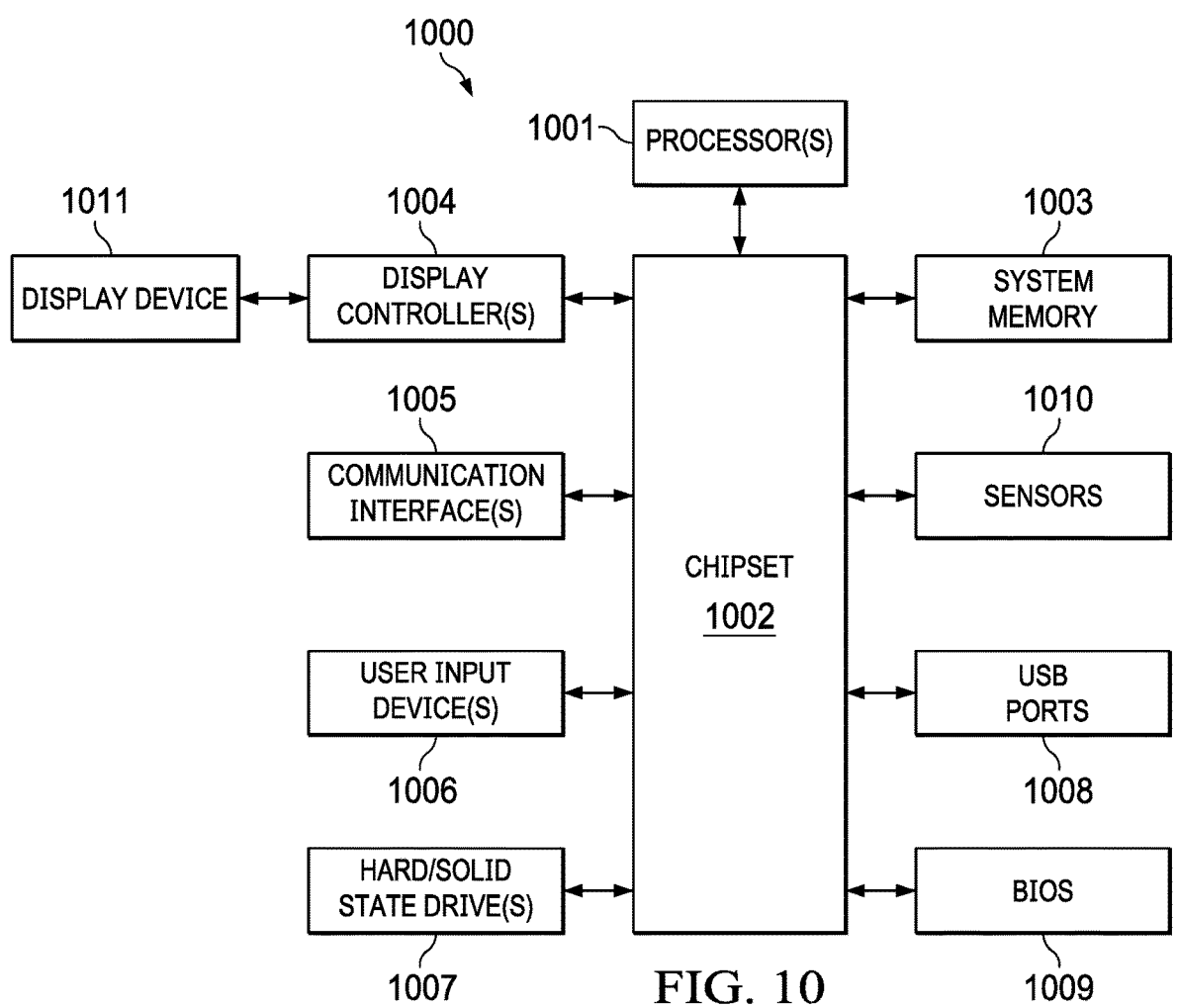
FIG. 10 is a block diagram of an example of internal components of an IHS, according to some embodiments.

FIG. 10 is a block diagram of an example of internal components 1000 of IHS 202, according to some embodiments. As depicted, components 1000 include processor 1001. In various embodiments, IHS 202 may be a single-processor system, or a multi-processor system including two or more processors. Processor(s) 1001 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 202 includes chipset 1002 coupled to processor(s) 1001. In certain embodiments, chipset 1002 may utilize a QuickPath Interconnect (QPI) bus to communicate with processor(s) 1001. In various embodiments, chipset 1002 may provide processor(s) 1001 with access to a number of resources. Moreover, chipset 1002 may be coupled to communication interface(s) 1005 to enable communications with other IHSs and/or peripheral devices via various wired and/or wireless networks, such as Ethernet, WiFi, BLUETOOTH, cellular or mobile networks (e.g., CDMA, TDMA, LTE, etc.), satellite networks, or the like. For example, communication interface(s) 1005 may be coupled to chipset 1002 via a PCIe bus.

Chipset 1002 may be coupled to display controller(s) 1004, which may include one or more or graphics processor(s) (GPUs) on a graphics bus, such as an Accelerated Graphics Port (AGP) or Peripheral Component Interconnect Express (PCIe) bus. As shown, display controller(s) 1004 provide video or display signals to display device 1011.

Display device 1011 may include a flexible display that is deformable (e.g., bent, folded, rolled, or stretched) by an external force applied thereto. For example, display device 1011 may include LCD, OLED, or AMOLED, plasma, electrophoretic, or electrowetting panel(s) or film(s). Moreover, display device 1011 may include a plurality of pixels arranged in a matrix, configured to display visual information, such as text, two-dimensional images, video, three-dimensional images, etc.

Display device 1011 may be configured to sense haptic and/or physical touch events, and to generate touch information. To this end, display device 1011 may include a touchscreen matrix (e.g., a layered capacitive panel or the like) and/or touch controller configured to receive and interpret multi-touch gestures from a user touching the screen with a stylus, or one or more fingers. Generally, display and/or touch control aspects of display device 1011 may be collectively operated and controlled by display controller 1004.

Chipset 1002 may also provide processor 1001 and/or display controller(s) 1004 with access to memory 1003. In various embodiments, system memory 1003 may be implemented using any suitable memory technology, such as static RAM (SRAM), dynamic RAM (DRAM) or magnetic disks, or any nonvolatile/Flash-type memory, such as a solid-state drive (SSD) or the like. Memory 1003 may store program instructions that, upon execution by processor 1001 and/or controller(s) 1004, present a UI interface to a user of IHS 100.

Chipset 1002 may further provide access to one or more hard disk and/or solid-state drives 1007. In certain embodiments, chipset 1002 may also provide access to one or more optical drives or other removable-media drives. In certain embodiments, chipset 1002 may also provide access to one or more Universal Serial Bus (USB) ports 1008.

Upon booting of IHS 202, processor(s) 1001 may utilize Basic Input/Output System (BIOS) 1009 instructions to initialize and test hardware components coupled to IHS 100 and to load an Operating System (OS) for use by IHS 202. BIOS 1009 provides an abstraction layer that allows the OS to interface with certain hardware components that are utilized by IHS 100. Via the hardware abstraction layer provided by BIOS 1009, software stored in memory 1003 and executed by the processor(s) 1001 of IHS 202 is able to interface with certain I/O devices that are coupled to IHS 202. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 1002 may also provide access to one or more user input devices 1006, for example, using a super I/O controller or the like. For instance, chipset 1002 may provide access to a keyboard, mouse, trackpad, stylus, totem, or any other peripheral input device, including touchscreen display 1011. These input devices may interface with chipset 1002 through wired connections (e.g., in the case of touch inputs received via display controller(s) 1004) or wireless connections (e.g., via communication interfaces(s) 1005). In some cases, chipset 1002 may be used to interface with user input devices such as keypads, biometric scanning devices, and voice or optical recognition devices.

In certain embodiments, chipset 1002 and/or EC 1009 may provide an interface for communications with one or more sensors 1010. Sensors 1010 may provide access to data describing environmental and operating conditions of IHS 202 (e.g., accelerometers, gyroscopes, hinge sensors, rotation sensors, hall effect sensors, lid sensors, temperature sensors, voltage sensors, current sensors, IR sensors, photosensors, proximity sensors, distance sensors, magnetic sensors, microphones, ultrasonic sensors, etc.).

In some cases, processor(s) 1001 may be configured to use context information collected by sensors 1010 to determine the relative orientation and movement of IHS 202. For instance, the sensor hub may utilize inertial movement sensors, that may include accelerometer, gyroscope, and magnetometer sensors, and are capable of determining the current orientation and movement of IHS 202 (e.g., IHS 202 is motionless on a relatively flat surface, IHS 202 is being moved irregularly and is likely in transport, the hinge of IHS 202 is oriented in a vertical direction). In certain embodiments, processor(s) 1001 may also determine a location and movement of IHS 202 based on triangulation of network signal and based on network information provided by the OS or network interface. In some embodiments, processor(s) 1001 may support additional sensors, such as optical, infrared and sonar sensors, that may provide support for xR (virtual, augmented, and/or mixed reality) sessions hosted by IHS 202 and may be used to provide an indication of a user's presence near IHS 202, such as whether a user is present, absent, and/or facing an IHS display.

In cases where an end-user is present before IHS 202, processor(s) 1010 may further determine a distance of the end-user from IHS 202, where this determination may be made continuously, at periodic intervals, or upon request. The detected or calculated distances may be used by processor(s) 1010 to classify the user as being in the IHS's near-field (user's position<threshold distance A), mid-field (threshold distance A<user's position<threshold distance B, where B>A), or far-field (user's position>threshold distance C, where C>B).

In embodiments where IHS 202 may support multiple physical configurations, such as a convertible laptop, N-in-1 device, or the like, processor(s) 1001 may utilize one or more mode sensors 1010 that collect readings that may be used in determining the current posture in which IHS 202 is physically configured. In certain embodiments, such posture determinations may be additionally made using the movement and orientation information provided by sensors 1010.

In laptop and convertible laptop embodiments, for example, processor(s) 1001 may utilize a lid position sensor 1010 to determine the relative angle between the two panels of the laptop in order to determine the mode in which IHS 202 is physically configured. In such embodiments, lid position sensor 1010 may measure the angle of rotation of the hinge that connects the base panel and lid panel of IHS 202. In some cases, processor(s) 1001 may collect lid position information, such as the hinge angle, to then use in determining the posture in which IHS 202 is configured.

Processor(s) 1001 may determine the posture of IHS 202 based, at least in part, on the angle of rotation of the hinge of IHS 202 from a closed position. A first range of hinge angles from a closed position may indicate a laptop posture, a second range of hinge angles may indicate a landscape posture and a third range of angles may indicate a tablet posture. Processor(s) 1001 may additionally utilize orientation and movement information collected from inertial movement sensors 1010 to further determine the posture in which IHS 202 is physically configured.

For instance, if processor(s) 1001 determine that IHS 202 is configured with a hinge angle of a laptop configuration, but IHS 202 is oriented on its side, IHS 202 may be determined to be in a book mode. If IHS 202 is determined to be tilted such that the hinge is oriented between horizontal and vertical, the user's face is detected to be facing the integrated display, and IHS 202 is experiencing slight movement, processor(s) 1001 may determine that IHS 202 is being used in a book posture. Processor(s) 1001 may determine that IHS 202 is opened to a 180-degree hinge angle and lies on a flat surface, thus indicating that IHS 202 it is being used in a landscape posture. Processor(s) 1001 may similarly determine that IHS 202 is in a tent configuration, in response to detecting a hinge angle within a defined range, such as between 300 and 345 degrees, such that the hinge is aligned horizontally and is higher than both display panels of IHS 202.

In some cases, values for the first and second force thresholds, a movement threshold, and/or a rotation threshold may be based upon context information obtained by sensors 1010. For example, when the user is in the near-field of IHS 202, one or more of the aforementioned thresholds may assume a first value, when the user is in the mid-field of IHS 202, the threshold(s) may assume a second value, and when the user is the far-field of IHS 202 the threshold(s) may assume a third value.

Moreover, when IHS 202 is a first posture, with a lid open, and/or when a first range of hinge angles is detected, one or more of the aforementioned thresholds may assume a first value. Conversely, when IHS 202 is in a second mode, with the lid closed, and/or when a second range of hinge angles is detected, one or more of the aforementioned thresholds may assume a second value.

In various embodiments, IHS 202 may not include all of components 1000 shown in FIG. 10. Additionally, or alternatively, IHS 202 may include components in addition to those shown in FIG. 10. Additionally, or alternatively, components represented as discrete in FIG. 10 may be integrated with other components. For example, all or a portion of the functionality provided by the illustrated components may be implemented in a System-On-Chip (SOC), or the like.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A mouse, comprising:
   a top surface;
   a touch sensor coupled to the top surface;
   a base;
   a radial movement sensor coupled to the base;
   a controller coupled to the touch sensor and the radial movement sensor;
   a memory coupled to the controller; and
   a casing that houses: the top surface, the touch sensor, the base, the radial movement sensor, the controller, and the memory, the memory having instructions stored thereon that, upon execution by the controller, cause the mouse to:
   in response to detection, by the touch sensor, of a force against the top surface, determine that the mouse is in a mouse mode of operation and: (a) identify a primary click if the force is equal to or greater than a first threshold and smaller than a second threshold, or (b) identify a secondary click if the force is equal to or greater than the second threshold; and
   in response to detection, by the radial movement sensor, of radial movement of the casing, determine that the mouse is in a wheel mode of operation, calibrate the mouse using lateral sensors on the casing to determine a position of a finger on the top surface of the mouse, and translate a rotation of the casing into a rotation of a Graphical User Interface (GUI) item in a radial menu rendered by an Information Handling System (IHS) via a display based on the calibration.

2. The mouse of claim 1, wherein the top surface comprises a touch-sensitive, round dish configured to accommodate a single human finger.

3. The mouse of claim 1, wherein the touch sensor comprises a capacitive sensor.

4. The mouse of claim 1, wherein the touch sensor comprises a piezoelectric sensor.

5. The mouse of claim 1, wherein the instructions, upon execution by the controller, further cause the mouse to identify the primary click if the force is equal to or greater than the first threshold at a first instant and smaller than the first threshold at a second instant, without reaching the second threshold between the first and second instants.

6. The mouse of claim 5, wherein the instructions, upon execution by the controller, further cause the mouse to identify the primary click as a click-and-drag command if a movement sensor coupled to the controller detects, between the first and second instants, movement equal to or greater than a threshold.

7. The mouse of claim 1, wherein the primary click conveys a selection of the GUI item.

8. The mouse of claim 1, wherein the secondary click invokes a menu associated with the GUI item.

9. A memory device having instructions stored thereon that, upon execution by a controller of a mouse, cause the mouse to:
   in response to detection of a force against a top surface of the mouse, determine the mouse is in a mouse mode of operation and perform at least one of: (a) identify a primary click if the force is equal to or greater than a first threshold and smaller than a second threshold; or (b) identify a secondary click if the force is equal to or greater than the second threshold, wherein the top surface comprises a touch-sensitive dish configured to accommodate a single human finger; and
   in response to detection of radial movement around a base of the mouse, determine that the mouse is in a wheel mode of operation, calibrate the mouse using lateral sensors on the casing to determine a position of a finger on the top surface of the mouse, and translate a rotation of the mouse into a rotation through Graphical User Interface (GUI) items in a radial menu rendered on a display.

10. The memory device of claim 9, wherein the instructions, upon execution by the controller, further cause the mouse to identify the primary click if the force is equal to or greater than the first threshold at a first instant and smaller than the first threshold at a second instant, without reaching the second threshold between the first and second instants.

11. The memory device of claim 10, wherein the instructions, upon execution by the controller, further cause the mouse to identify the primary click as a click-and-drag command if a movement sensor coupled to the controller detects, between the first and second instants, movement equal to or greater than a threshold.

12. The memory device of claim 9, wherein the primary click conveys a selection of a GUI item rendered on the display.

13. The memory device of claim 9, wherein the secondary click invokes a menu associated with a GUI item rendered on the display.

14. The method of claim 9, wherein the GUI items are selected based upon a state of an IHS coupled to the display.

15. A method, comprising:
   determining if a mouse with a cylindrical casing is in a mouse mode of operation or a wheel mode of operation;
   in response to detection of a force against a top surface of the mouse, determine that the mouse is in a mouse mode of operation and perform at least one of: (i) identifying a primary click if the force is equal to or greater than a first threshold and smaller than a second threshold; or (ii) identifying a secondary click if the force is equal to or greater than the second threshold; and
   in response to detection of radial movement of the cylindrical casing around a base of the mouse, determining that the mouse is in a wheel mode of operation, calibrating the mouse using lateral sensors on the casing to determine a position of a finger on the top surface of the mouse, and translating a rotation of the cylindrical casing into a rotation through Graphical User Interface (GUI) items in a radial menu rendered on a display.

16. The method of claim 15, wherein the top surface comprises a touch-sensitive dish configured to accommodate a single human finger.

17. The method of claim 15, wherein identifying the primary click further comprises determining that the force is equal to or greater than the first threshold at a first instant and smaller than the first threshold at a second instant, without reaching the second threshold between the first and second instants.

18. The method of claim 17, further comprising identifying the primary click as a click-and-drag command if a movement sensor coupled to the controller detects, between the first and second instants, movement equal to or greater than a threshold.

19. The method of claim 15, wherein the primary click conveys a selection of a GUI item rendered via the display.

20. The method of claim 15, wherein the secondary click invokes a menu associated with a GUI item rendered via the display.

* * * * *